United States Patent
Carney et al.

(10) Patent No.: US 6,449,663 B1
(45) Date of Patent: Sep. 10, 2002

(54) METHOD AND APPARATUS FOR ADJUSTING AN INTERVAL OF POLLING A NETWORK PRINTER BASED ON CHANGES IN WORKING STATUS OF THE NETWORK PRINTER

(75) Inventors: Dennis Michael Carney, Louisville; Ryan Hoa Nguyen, Westminster, both of CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/112,697

(22) Filed: Jul. 8, 1998

(51) Int. Cl.⁷ ................................................ G06F 13/10
(52) U.S. Cl. .......................... 710/15; 710/18; 710/46; 709/224; 370/449
(58) Field of Search ............................. 710/15, 18, 19, 710/46, 220; 370/450, 453, 454, 457, 449; 702/182, 186; 709/223, 224

(56) References Cited

U.S. PATENT DOCUMENTS

| | | | | |
|---|---|---|---|---|
| 4,598,363 A | * | 7/1986 | Clark et al. ................. 364/200 |
| 4,903,319 A | * | 2/1990 | Kasai et al. ................... 455/33 |
| 5,084,875 A | * | 1/1992 | Weinberger et al. ......... 371/291 |
| 5,469,436 A | * | 11/1995 | Brandner et al. ........... 370/85.2 |
| 5,561,769 A | | 10/1996 | Kumar et al. ................ 395/200 |
| 5,566,351 A | * | 10/1996 | Crittenden et al. ............ 710/47 |
| 5,680,454 A | * | 10/1997 | Mead ........................... 380/14 |
| 5,710,885 A | | 1/1998 | Bondi ......................... 395/200 |
| 5,758,189 A | * | 5/1998 | Nakada et al. ................ 710/46 |
| 5,786,923 A | * | 7/1998 | Doucet et al. ............... 359/172 |
| 5,848,410 A | * | 12/1998 | Walls et al. .................... 707/4 |
| 5,893,115 A | * | 4/1999 | Lewis ......................... 707/201 |
| 6,101,500 A | * | 8/2000 | Lau ............................ 707/103 |

FOREIGN PATENT DOCUMENTS

| | | | |
|---|---|---|---|
| JP | 06075887 A | * | 3/1994 |
| JP | 10327148 A | * | 12/1998 |
| JP | 11154955 | * | 6/1999 |

OTHER PUBLICATIONS

IBM Corporation—Adaptive Polling Algorithm for Monitoring Multimedia Devices—Sep. 1993—Journal–vol. 36—Issue No. 9A—p. 83–84.*

* cited by examiner

Primary Examiner—Jeffrey Gaffin
Assistant Examiner—Thuan Du
(74) Attorney, Agent, or Firm—Blakely, Sokoloff, Taylor, Zafmann, LLP

(57) ABSTRACT

A method and apparatus for adjusting an interval of polling a peripheral device (e.g., a printer) based on a change in the working status of the peripheral device. In one embodiment of the present invention, if the peripheral device being monitored is in the process of performing a job or has experienced an interrupt/alert, the length of the polling intervals may be shortened to provide increased monitoring of the peripheral device. If the peripheral device is idle, the length of the polling intervals may be longer to provide less monitoring of the peripheral device.

59 Claims, 2 Drawing Sheets

METHOD AND APPARATUS FOR ADJUSTING AN INTERVAL OF POLLING A NETWORK PRINTER BASED ON CHANGES IN WORKING STATUS OF THE NETWORK PRINTER

NOTICE OF RELATED APPLICATIONS

A separate application includes subject matter that may be related to the present application herein. The potentially related pending application is entitled Method and Apparatus For Adjusting An Interval of Polling A Peripheral Device In Response to Changes In the Status and/or Reliability of Receiving Traps, Ser. No. 09/112,703 filed on Jul. 8, 1998 by Steve Price, Kathy Melton, Dennis Carney, Karen Harrison, and Ryan Nguyen.

FIELD OF THE INVENTION

The present invention relates to the management of one or more peripheral devices shared by one or more of stations (e.g., computers).

BACKGROUND OF THE INVENTION

Computers typically have peripheral devices (e.g., printers, scanners, etc.) interconnected to the computers via the network. The peripheral devices perform tasks/jobs at the request of the computers.

In order to collect current information about the status of a peripheral device, a computer may use a management application. The application may communicate with the peripheral devices via a communication protocol, such as Simple Network Management Protocol (SNMP). Alternative communication protocols may also be used.

In the case of a printer, one type of information collected by the management application typically includes whether an interrupt has occurred at the printer, such as the printer being out of paper, out of ink, a paper jam occurring, etc. The occurrence of an interrupt is sometimes referred to as an alert.

By discovering that an alert has occurred, an operator of a computer interconnected to the peripheral device may take steps to resolve the interrupt to allow the routine operations of the peripheral device to resume. Alternatively, a computer interconnected with the printer may be able to resolve the alert without the intervention of an operator.

The management applications may collect status information (i.e., determine if an interrupt has occurred) from the peripheral device by periodically sending an inquiry to (i.e. polling) each device, in order to collect information regarding the device. The period of time between requests/polls is known as the polling interval.

When a management application uses polling to collect information regarding a peripheral device, there are tradeoffs. For example, by using shorter intervals between polling inquiries (i.e., more frequently polling) less time will pass before an alert is discovered. However, the more frequent polling is provided at the cost of increased network traffic and the additional consumption of processing resources.

In addition, the need to monitor the status and the settings of a peripheral device typically increases when the peripheral device is in the process of performing a job. However, if the peripheral device is sitting idle, the need to monitor the peripheral device decreases (as should the frequency of polling the peripheral device.)

The prior art, however, provides fixed algorithms for polling peripheral devices without allowing the frequency of polling the peripheral device to vary as the need to monitor the peripheral device varies. Therefore, a need exists for adjusting the rate of polling peripheral devices as the need to monitor the peripheral device changes.

SUMMARY OF THE INVENTION

The present invention provides method and apparatus for adjusting an interval of polling a peripheral device (e.g., a printer) based on a change in the working status of the peripheral device. In one embodiment of the present invention, if the peripheral device being monitored is in the process of performing a job or has experienced an interrupt/alert, the length of the polling intervals may be shortened to provide increased monitoring of the peripheral device. If the peripheral device is idle, the length of the polling intervals may be longer to provide less monitoring of the peripheral device.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

The present invention provides method and apparatus for adjusting an interval of polling a peripheral device based on a change in the working status of the peripheral device.

As is explained in more detail below, in one embodiment of the present invention, the length of the polling intervals are adjusted based on the working status of the peripheral device being monitored. For example, in one embodiment of the present invention, if the peripheral device being monitored is in the process of performing a job, the length of the polling intervals may be shortened to provide increased monitoring of the peripheral device. On the other hand, if the peripheral device is idle, the length of the polling intervals may be longer to provide less monitoring of the peripheral device.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Figure 1:
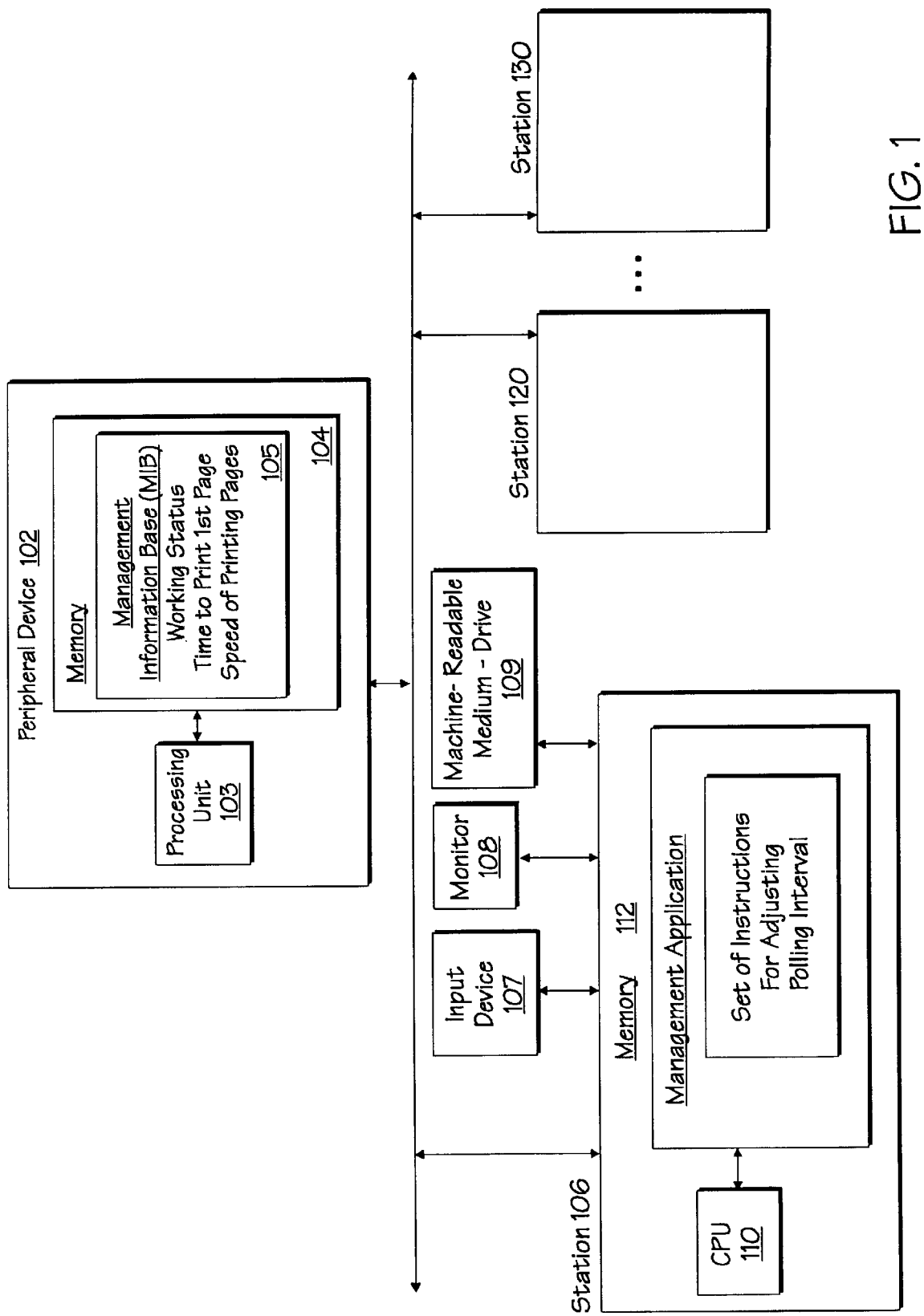
FIG. 1 illustrates a network configuration implementing one embodiment of the present invention.

FIG. 1 illustrates the interconnection of a peripheral device 102 (e.g., printer, and scanner) and a first station 106. It is within the scope of the present invention for station 106 to consist of a workstation, server, personal computer system, set top box, or any other information-handling device that may monitor the status of a peripheral device. Moreover, station 106 may implement the present invention to monitor a set of peripheral devices.

In the embodiment illustrated in FIG. 1, the station includes a input device 107 for entering data into station 106, a monitor 108 for displaying data, and a machine-readable medium drive 109 (e.g., disk drive) for providing access to data and instructions stored on machine-readable medium. Station 106 also internally includes a central processing unit (CPU) 110 for processing data and executing instructions, and memory unit 112 for storing data and groups of instructions (e.g., programs or applications), which when executed perform desired operations.

One embodiment of station 106 is also illustrated in FIG. 1 as storing a management application in memory 112, which may provide the ability to monitor peripheral devices and set parameters on the peripheral devices. In one embodiment of the present invention, the management application communicates with peripheral 102 via the Simple Network Management Protocol (SNMP) application based on User Datagram Protocol/Internet Protocol (UDP/IP). Alternative communication protocols may also be used without departing from the scope of the present invention.

As is also shown in FIG. 1, the management application includes a set of instructions for adjusting the interval of polling the peripheral device, according to one embodiment of the present invention, as is described in more detail below. In alternative embodiments, the set of instructions for adjusting the interval of polling the peripheral device could be stored in memory exclusive of the management application, or alternatively, could be implemented in hardware circuitry or firmware (e.g., Read Only Memory), and referred to as a first device.

Also shown in FIG. 1 is one embodiment of peripheral device 102 consisting of processing unit 103 and memory 104 having stored therein a Management Information Base (MIB) 105. MIB 105 is shown to include a set of status information relating to peripheral device 102, including the working status of peripheral device 102.

The working status, as referred to herein, may indicate whether peripheral device 102 is in the process of performing a "job" or "task" (e.g., printing a document). Alternatively, the working status may also indicate if an alert has occurred at peripheral device 102. The working status of peripheral device 102 may be read by station 106 during a polling inquiry (e.g., an SNMP request) as is described in more detail below.

In alternative embodiments, MIB 105 may also include additional information, such as the speed of printing pages, the time that passes before the first page of a document is printed, and/or the rate at which the working status stored in the MIB is updated. Additional items of information may also be included in the MIB without departing from the scope of the invention.

In addition, the location of MIB 105 may also vary within the scope of the invention. For example, MIB 105 may be stored on a machine-readable medium accessible via a disk drive coupled to the peripheral device or in Random Access Memory (RAM) within a separate device coupled to the peripheral device.

As is illustrated in FIG. 1 peripheral device 102 and station 106 may be interconnected in a network configuration (e.g., Local Area Network (LAN)) that includes additional stations interconnected with the peripheral device. It is also within the scope of the present invention, however, to have only one station connected with the peripheral device.

Figure 2:
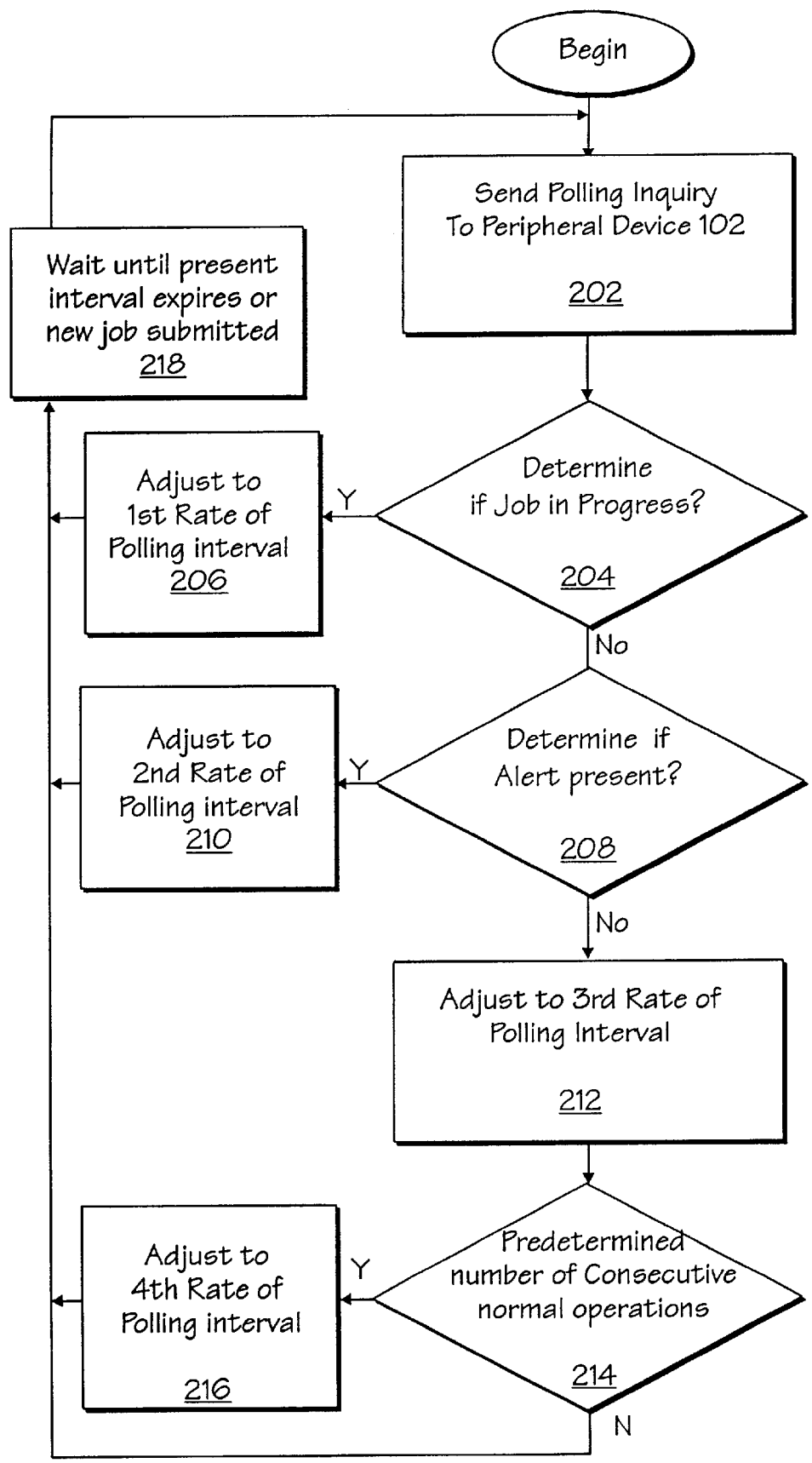
FIG. 2 illustrates a flow diagram describing the steps of the present invention according to one embodiment.

FIG. 2 illustrates a flow diagram describing the steps of adjusting the interval of polling a peripheral device according to one embodiment of the present invention. The steps described in FIG. 2 may be performed when the set of instructions for adjusting the interval of polling a peripheral device are executed. In step 202, station 106 issues a polling inquiry to peripheral device 102 to determine the working status of peripheral device 102. In one embodiment, the working status is determined by reading the MIB of the peripheral device.

In step 204, station 106 determines if the working status of peripheral device 102 is a job in progress. If the working status of peripheral device 102 is a job in progress, in step 206 station 106 will adjust the interval of polling peripheral device 102 to a first rate by decreasing the time between the polling inquiries (i.e., use short polling intervals). In one embodiment, the adjusting of the interval of polling a peripheral device is done dynamically and automatically, without the intervention of a user operator.

In one embodiment of the present invention, polling inquiries are sent to the peripheral device in accordance with a timer, which is reset after each polling inquiry is sent to the peripheral device. Adjusting the interval of polling the peripheral device may be performed by lengthening or shortening the setting of a timer, in accordance with the desired rate of polling the peripheral device.

In one embodiment, station 106 and/or other stations may have submitted the jobs in progress at peripheral device 102. As a result, the extent of adjusting the interval of polling the peripheral device may vary based on whether the respective job in progress was submitted by the respective station that has sent the polling inquiry.

Consider the example of station 106 discovering peripheral device 102 is in the process of performing a job for station 120. As a result, the length of the polling inquiry may be shortened, but may not be shortened as much as it would be if peripheral device 102 was in the process of performing a job for station 106.

In step 208, station 106 determines if peripheral device 102 has an alert as a working status (which may indicate that an interrupt has occurred at the peripheral device, such as a paper jam.) If peripheral device 102 has an alert as a working status, in step 210 station 106 may adjust the interval of polling the peripheral device to a second rate (which may be different from the first rate) by decreasing the time between the polling inquiries (i.e., use short polling intervals).

In one embodiment, the length of the intervals in the first rate are shorter than the length of the intervals in the second rate. However, in alternative embodiments, the length of the intervals in the second rate may be shorter than the length of the intervals in the first rate, without departing from the scope of the invention.

If station 106 determines that peripheral device 102 does not have a working status of a job in progress or an alert, the working status of peripheral device 102 is considered to be in normal operation. As a result, in step 212 station 106 may adjust the interval of polling the peripheral device to a third rate by increasing the time between the polling inquiries (i.e., use polling intervals that may be longer than the polling intervals of the first and second rates).

In an alternative embodiment, station 106 may keep a tally of the number of consecutive times peripheral device 106 is determined to be in normal operations. In step 214, station 106 determines if peripheral device 102 has had a working status of normal for a predetermined number of consecutive polling inquiries. If the working status of peripheral device 102 has been in normal operations for a predetermined number of consecutive polling inquiries, in step 216 station 106 may adjust the interval of polling peripheral device 102 to a fourth rate (e.g., slow rate) by further increasing the time between the polling inquiries.

In one embodiment, the intervals of polling the peripheral device in the fourth rate are longer than the polling intervals of the first, second, and third rate. As a result of increasing the length of time between polling inquiries, network traffic is decreased and processing resources are conserved.

In addition, in one embodiment, the polling inquiry sent to peripheral device 102 may also determine if a job and/or alert has occurred and already completed and/or been resolved during the polling interval following the previous polling inquiry. The occurrence of a job and/or alert, that has already completed and/or been resolved, may be detected by reading the settings of peripheral device 102. If a job and/or alert has occurred during the polling interval, the tally is reset to 0.

In step 218, the method of the present invention waits until the present interval expires before sending the next polling inquiry to peripheral device 102. However, if a new job is submitted to peripheral device 102 by the respective station before the present interval expires, a polling inquiry may be sent to peripheral device before the present polling interval expires.

After adjusting the interval of polling peripheral device 102 in accordance with the working status of peripheral device 102, steps 202 through 218 may be repeated for subsequent polling inquiries. As a result, station 106 may use an efficient rate of polling peripheral device 102 in view of the current working status of peripheral device 102. Moreover, the step of determining if an alert has occurred at the peripheral device may be performed prior to determining if the peripheral device has a job in progress, without departing from the scope of the invention.

In alternative embodiments, adjusting of the interval of polling the peripheral device when the peripheral device has a job in progress may vary based on additional status information, which may be provided in the MIB. For example, the polling interval may vary based on the frequency (i.e., number of occurrences within a specified period of time) of updating MIB 105.

A second factor in adjusting the polling interval may include the content of a print job. For example, the peripheral device may be polled less frequently if a graphical image is being printed by the peripheral device.

A third factor in adjusting the polling interval may include the speed of the respective peripheral device. For example, the frequency of polling a peripheral device may take into consideration the speed/rate at which the respective peripheral device is able to print pages of a job. Moreover, in the case of a printer, the interval of polling the printer may be adjusted to poll the printer per multiple of pages printed (e.g. once for each page printed or once for every three pages printed).

In addition, in another embodiment of the present invention, after adjusting the interval of polling peripheral device 102 to a first rate, the first polling inquiry of the first rate may be delayed for a predetermined period of time. That is, the first polling inquiry may be delayed for a period of time equal to the time that will elapse prior to printing the first page of the present job. The time that will elapse prior to printing the first page of the present job may be provided in MIB 105.

The present invention of adjusting the interval of polling a peripheral device, may be provided as a computer program product which may include a machine-readable medium having stored thereon instructions which can be used to program a computer (or other electronic devices) to perform a process according to the present invention. The machine-readable medium may include, but is not limited to floppy disks, optical disks, CD-ROMs, and magneto-optical disks, ROMs, RAMs, EPROMs, EEPROMs, magnet or optical cards, or any type of media/machine-readable medium suitable for storing electronic instructions.

Moreover, the present invention of adjusting the interval of polling a peripheral device may also be downloaded as a computer program product, wherein the program would be transferred from a remote computer to a requesting computer by means of a communication link (e.g., a modem or network connection).

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:

periodically determining a working status of a network printer residing on a network by performing a polling inquiry in accordance with a polling interval associated with the network printer and reading a Management Information Base (MIB) stored within the network printer indicating the working status of the network printer, the working status indicating whether or not a print job is currently being processed by the network printer;

decreasing network traffic on the network and conserving processing resources associated with the network by lengthening the polling interval associated with the network printer and thereby temporarily increasing the length of time between polling inquiries if the working status indicates the network printer is not currently processing a print job; and shortening the polling interval associated with the network printer and thereby temporarily decreasing the length of time between polling inquiries if the working status indicates the network printer is currently processing a print job.

2. The method of claim 1, wherein said lengthening said polling interval includes selecting from a plurality of different rates of polling said network printer.

3. The method of claim 2, wherein if said working status of said network printer is determined to be a job in progress, said lengthening includes lengthening said polling interval to a first rate.

4. The method of claim 3, wherein a length of time between polling inquires during a first rate of polling said network printer varies based on additional status information.

5. The method of claim 4, wherein said additional status information includes content of a job, speed of network printer, or a rate of updating said working status of said network printer.

6. The method of claim 4, wherein upon determining said working status is said job in progress working status, a first polling inquiry of said first rate of polling said network printer is delayed for at least a period of time equal to begin printing a first page of a job.

7. The method of claim 4, wherein during said first rate of polling said network printer, a polling inquiry is submitted per a multiple of pages of a job in progress.

8. The method of claim 4, wherein said lengthening is performed dynamically.

9. The method of claim 8, wherein said lengthening is performed automatically.

10. The method of claim 2, wherein if said working status of said network printer is determined to include an alert status, said lengthening includes lengthening said polling interval to a second rate, said second rate having a frequency different from a first rate.

11. The method of claim 2, wherein if said working status of said network printer is determined to include an alert status, said lengthening includes lengthening said polling interval to a second rate, said second rate having a frequency equal to a first rate.

12. The method of claim 2, wherein if said working status of said network printer is determined to be a normal operation status, said lengthening includes lengthening said polling interval to a third rate, wherein said third rate is less frequent than a first rate and a second rate.

13. The method of claim 12, wherein said normal operation includes a working status of no job in progress status and no alert.

14. The method of claim 12, wherein if said working status is unchanged for a predetermined number of polling inquiries, said lengthening includes lengthening said polling interval to a fourth rate, wherein said fourth rate is less frequent than said third rate.

15. The method of claim 1, wherein the processor increases said polling interval of lengthened varies based upon the content of the print job.

16. The method of claim 15, wherein the amount is greater when the content of the print job comprises graphics.

17. The method of claim 1, wherein the Management Information Base further indicates a rate at which the working status of the network printer is updated.

18. The method of claim 1, wherein said working status is determined to include an alert status indicating that an interrupt has occurred.

19. The method of claim 18, wherein said interrupt indicates that a paper jam has occurred.

20. The method of claim 1, wherein said polling interval of said network printer is increased if the content of the print job is a graphical image.

21. A machine-readable medium having stored thereon data representing sequences of instructions, the sequences of instructions which, when executed by a processor, cause the processor to:
   periodically determine a working status of a network printer residing on a network by performing a polling inquiry in accordance with a polling interval associated with the network printer and reading a Management Information Base (MIB) stored within the network printer indicating the working status of the network printer, the working status indicating whether or not a print job is currently being processed by the network printer;
   decrease network traffic on the network and conserve processing resources associated with the network by lengthening the polling interval associated with the network printer and thereby temporarily increasing the length of time between polling inquiries if the working status indicates the network printer is not currently processing a print job; and
   shorten the polling interval associated with the network printer and thereby temporarily decrease the length of time between polling inquiries if the working status indicates the network printer is currently processing a print job.

22. The machine-readable medium of claim 21, wherein said lengthening said polling interval includes selecting from a plurality of different rates of polling said network printer.

23. The machine-readable medium of claim 22, wherein if said working status of said network printer is determined to be a job in progress, said lengthening includes lengthening said polling interval to a first rate.

24. The machine-readable medium of claim 23, wherein a length of time between polling inquires during a first rate of polling said network printer varies based on additional status information.

25. The machine-readable medium of claim 24, wherein said additional status information includes content of a job, speed of network printer, or a rate of updating said working status of said network printer.

26. The machine-readable medium of claim 24, wherein upon determining said working status is said job in progress working status, a first polling inquiry of said first rate of polling said network printer is delayed for at least a period of time equal to begin printing a first page of a job.

27. The machine-readable medium of claim 24, wherein during said first rate of polling said network printer, a polling inquiry is submitted per a multiple of pages of a job in progress.

28. The machine-readable medium of claim 24, wherein said lengthening is performed dynamically.

29. The machine-readable medium of claim 28, wherein said lengthening is performed automatically.

30. The machine-readable medium of claim 22, wherein if said working status of said network printer is determined to include an alert status, said lengthening includes lengthening said polling interval to a second rate, said second rate having a frequency different from a first rate.

31. The machine-readable medium of claim 22, wherein if said working status of said network printer is determined to include an alert status, said lengthening includes lengthening said polling interval to a second rate, said second rate having a frequency equal to a first rate.

32. The machine-readable medium of claim 31, wherein said alert status indicates that an interrupt has occurred.

33. The machine-readable medium of claim 32, wherein said interrupt indicates that a paper jam has occurred.

34. The machine-readable medium of claim 22, wherein if said working status of said network printer is determined to be normal operation status, said lengthening includes lengthening said polling interval to a third rate, wherein said third rate is less frequent than a first rate and a second rate.

35. The machine-readable medium of claim 34, wherein said normal operation includes a working status of no job in progress status and no alert.

36. The machine-readable medium of claim 34, wherein if said working status is unchanged for a predetermined number of polling inquires, said lengthening includes lengthening said polling interval to a fourth rate, wherein said fourth rate is less frequent than said third rate.

37. The machine-readable medium of claim 21, wherein the Management Information Base further indicates a rate at which the working status of the network printer is updated.

38. The machine-readable medium of claim 21, further comprising adjusting the polling interval of said network printer in accordance with content of a print job.

39. The machine-readable medium of claim 38, wherein said polling interval of said network printer is increased if the content of the print job is a graphical image.

40. A system comprising:
   a network;
   a network printer connected with the network and comprising a Management Information Base (MIB) stored within the network printer indicating the working status of the network printer, the working status indicating whether or not a print job is currently being processed by the network printer; and
   a processor connected with the network to periodically determine a working status of a network printer residing on a network by performing a polling inquiry in accordance with a polling interval associated with the network printer and reading the MIB stored within the network printer, decrease network traffic on the network and conserve processing resources associated with the network by lengthening the polling interval associated with the network printer and thereby temporarily increasing the length of time between polling inquiries if the working status indicates the network printer is not currently processing a print job, and shorten the polling interval associated with the network printer and thereby temporarily decrease the length of time between polling inquiries if the working status indicates the network printer is currently processing a print job.

41. The system of claim 40, wherein said processor lengthens said polling interval by selecting from a plurality of different rates of polling said network printer.

42. The system of claim 41, wherein if the processor determines said working status of said network printer to be a job in progress, the processor lengthens said polling interval to a first rate.

43. The system of claim 42, wherein a length of time between polling inquires during a first rate of polling said network printer varies based on additional status information.

44. The system of claim 43, wherein said additional status information includes content of a job, speed of network printer, or a rate of updating said working status of said network printer.

45. The system of claim 43, wherein the processor, upon determining said working status is said job in progress working status, delays a first polling inquiry of said first rate of polling said network printer for at least a period of time equal to begin printing a first page of a job.

46. The system of claim 43, wherein the processor, during said first rate of polling said network printer, submits a polling inquiry per a multiple of pages of a job in progress.

47. The system of claim 43, wherein the processor lengthens the polling interval dynamically.

48. The system of claim 47, wherein the processor lengthens the polling interval automatically.

49. The system of claim 41, wherein if the processor determines said working status of said network printer to include an alert status, the processor lengthens said polling interval to a second rate, said second rate having a frequency different from a first rate.

50. The system of claim 41, wherein if the processor determines said working status of said network printer to include an alert status, the processor lengthens said polling interval to a second rate, said second rate having a frequency equal to a first rate.

51. The system of claim 41, wherein if the processor determines said working status of said network printer to be a normal operation status, the processor lengthens said polling interval to a third rate, wherein said third rate is less frequent than a first rate and a second rate.

52. The system of claim 51, wherein said normal operation includes a working status of no job in progress status and no alert.

53. The system of claim 51, wherein if said working status is unchanged for a predetermined number of polling inquiries, the processor lengthens polling interval to a fourth rate, wherein said fourth rate is less frequent than said third rate.

54. The system of claim 40, wherein an amount by which the processor lengthens the polling interval varies based upon the content of the print job.

55. The system of claim 54, wherein the amount is greater when the content of the print job comprises graphics.

56. The system of claim 40, wherein the Management Information Base further indicates a rate at which the working status of the network printer is updated.

57. The system of claim 40, wherein said working status is determined to include an alert status indicating that an interrupt has occurred.

58. The system of claim 57, wherein said interrupt indicates that a paper jam has occurred.

59. The system of claim 40, wherein the processor increases said polling interval of said network printer if the content of the print job is a graphical image.

* * * * *